United States Patent [19]
Overath et al.

[11] Patent Number: 4,883,550
[45] Date of Patent: Nov. 28, 1989

[54] METHOD OF MANUFACTURING FIBER-REINFORCED ARTICLES OR PLASTICS MATERIAL

[75] Inventors: Friedhelm Overath; Michael Weyer, both of Schaffhausen, Switzerland

[73] Assignee: Georg Fischer AG, Schaffhausen, Switzerland

[21] Appl. No.: 186,150

[22] Filed: Apr. 26, 1988

[30] Foreign Application Priority Data

Apr. 30, 1987 [CH] Switzerland .................. 01650/87

[51] Int. Cl.$^4$ .............................................. B29C 41/14
[52] U.S. Cl. ................................... 156/171; 156/287; 264/22; 264/102; 264/257; 264/512
[58] Field of Search ............... 156/169, 172, 171, 287; 264/40.1, 102, 257, 511, 512; 427/54.1, 393.5, 430.1, 296

[56] References Cited
U.S. PATENT DOCUMENTS 2,887,721 5/1959 Blanchi et al. .................. 156/169
3,975,479 8/1976 McClean ........................... 264/102
4,374,689 2/1983 Smith et al. ....................... 156/169
4,417,937 11/1983 Escher et al. ..................... 156/169
4,479,984 10/1984 Levy et al. ........................ 427/163
4,504,086 3/1985 Carrow ............................. 156/172
4,649,960 3/1987 Policelli ........................... 464/182
4,748,048 5/1988 Anton et al. ...................... 156/172

OTHER PUBLICATIONS

Gellhorn et al, *Gummi, Asbest Kunststoffe*, vol. 35 (1982) pp. 630–635.

Primary Examiner—Jan H. Silbaugh
Assistant Examiner—Allan R. Kuhns
Attorney, Agent, or Firm—Toren, McGeady & Associates

[57] ABSTRACT

A method of manufacturing a fiber-reinforced shaped article of plastics material for pipeline systems. The article includes an inner casing of a thermoplastic material and an outer casing of a fiber winding impregnated with resin. The tape is wound onto the inner casing so that at least the entire surface thereof is covered. The article is then immersed in a resin bath while a negative pressure is maintained outside of and in the interior of the article. The resin bath is subsequently subjected to atmospheric pressure. The impregnated article is removed from the resin bath and the resin is hardened by ultraviolet light while the article is simultaneously rotated.

5 Claims, 2 Drawing Sheets

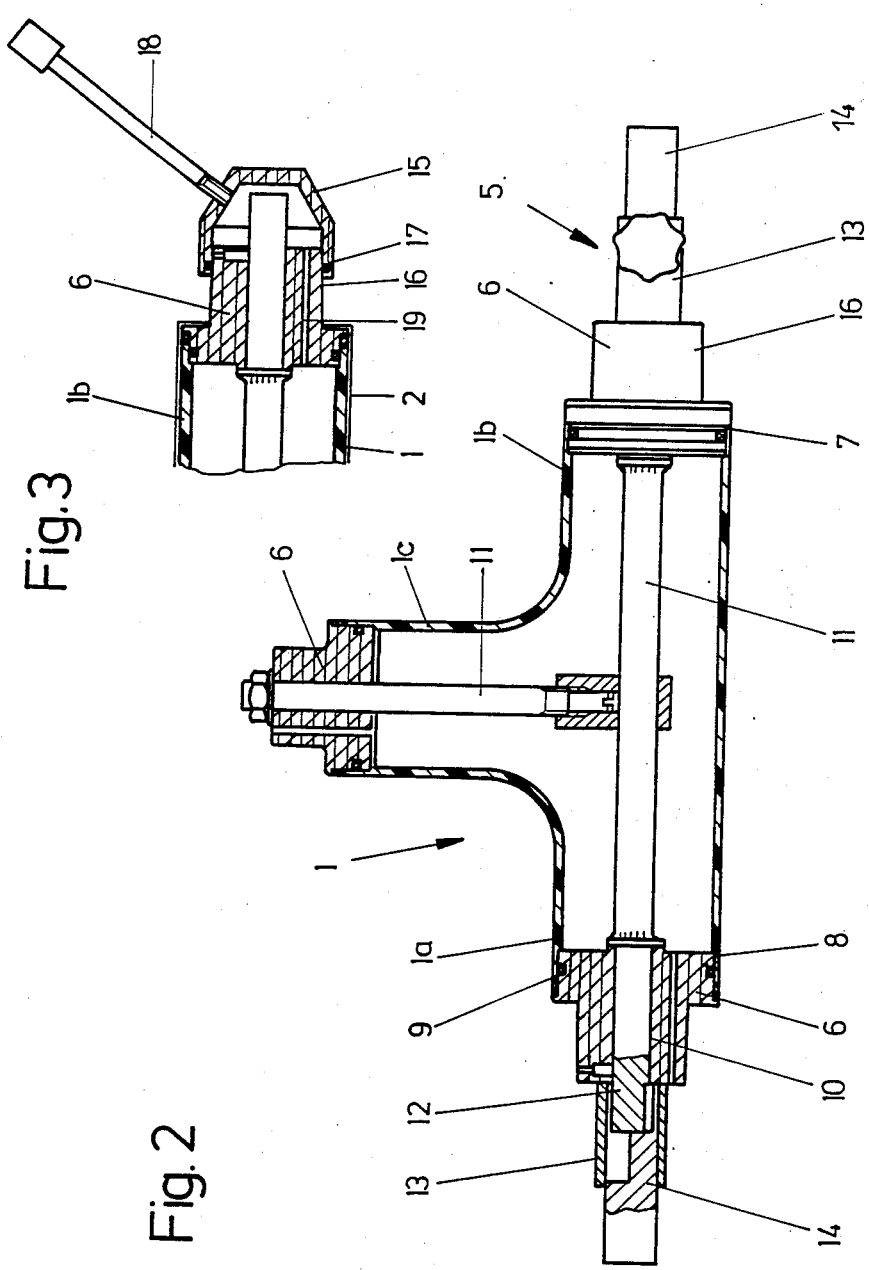

METHOD OF MANUFACTURING FIBER-REINFORCED ARTICLES OR PLASTICS MATERIAL

BACKGROUND OF THE INVENTION

1. Field of the Invention

The present invention relates to a method of manufacturing a fiber-reinforced shaped article of plastics material for pipeline systems. The article includes an inner casing of a thermoplastic material and an outer casing of a fiber winding impregnated with synthetic resins.

2. Description of the Prior Art

In pipeline systems for conducting media, particularly aggressive media in the chemical industry, pipelines are used which have an inner casing of a thermoplastic material, such as, polyethylene, polypropylene, polyvinyl chloride, etc., and an outer casing of a fiber-reinforced laminate, such as, wound glass fiber impregnated with an unsaturated polyester resin or epoxy resin. The outer casing of laminate has the purpose to reinforce the pipes, so that media can be conducted at increased pressures and external forces can be absorbed, such as, tensile or compressive bending forces acting on the pipeline.

Pipeline systems of this type require appropriately shaped pieces, for example, T-pieces, crosspieces, angles, bends or reducing sleeves, as they are necessary in the conventional pipeline construction.

In the known methods for manufacturing such shaped articles or pieces, the winding is carried out in a so-called wet procedure, i.e., the glass fibers or the glass fiber tapes are impregnated with resin during the winding procedure. However, when winding is carried out with machines operating according to the lathe principle, only simply shaped pipe pieces or bend pieces can be wound using the wet procedure. Such a winding procedure using a machine cannot be used for complicated pieces, such as T-pieces or crosspieces, because the tape including the container with the impregnating substance, would have to be rotated above its longitudinal axis during the windings. In addition, the glass fiber fabric tapes cannot be sufficiently impregnated with resin when high winding speeds are employed.

It is, therefore, the primary object of the present invention to provide a method of the above-described type in which even complicated glass fiber-reinforced articles can be manufactured by means of a machine and in which a uniform quality and the necessary strength of the articles is ensured. It should be possible to use the method for all types of pieces used in pipeline construction and it should be possible to manufacture the pieces automatically in large numbers while keeping the costs low.

SUMMARY OF THE INVENTION

In accordance with the present invention, a dry glass fiber fabric tape is wound in accordance with a given program onto an injection-molded article of thermoplastic material which forms the inner casing. The tape is wound onto the article so that at least the entire surface thereof is covered. The article onto which the tape has been wound is immersed into a resin bath while a negative pressure is maintained outside of and in the interior of the article. The resin bath is subsequently subjected to atmospheric pressure. The impregnated article is then removed from the resin bath and the resin is hardened by means of ultraviolet light while the article is simultaneously rotated.

Since the glass fiber fabric tape is wound onto the injection-molded article in the dry state, it is possible to wind even complicated T-pieces or crosspieces in accordance with a program by means of a 4-axis NC-controlled winding machine because, in this case, it is necessary to rotate the tape.

The impregnation of the winding in a resin bath under a previously produced negative pressure with subsequent subjecting of the bath to an atmospheric pressure ensures that the entire glass fiber winding applied to the article is thoroughly impregnated.

By using a resin which is hardenable by means of UV-radiation, the resin can stay in the container for a longer period of time without becoming useless.

The entire procedure according to the present invention can be easily automated.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWING

In the drawing:

FIG. 2 is a cross-sectional view of an injection-molded article mounted on a winding mandrel; and FIG. 3 is a partial sectional view of the article of FIG. 2, with a cover sleeve mounted thereon.

DETAILED DESCRIPTION OF THE INVENTION

Figure 1A:
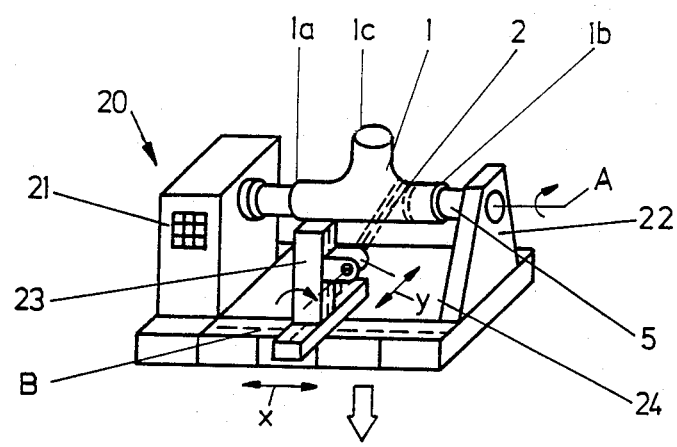
Figs. 1a to 1d are schematic perspective views illustrating the method according to the present invention of manufacturing glass fiber-reinforced articles.

FIG. 1a of the drawing is a schematic illustration of a winding machine 20 for winding a glass fiber fabric tape 2 onto an injection-molded article 1 of thermoplastic material article 1 is a T-piece with three tubular ends 1a, 1b, 1c. A winding mandrel 5 is arranged concentrically with ends 1a and 1b. Winding mandrel 5 serves to receive the article 1 in the winding machine 20. Prior to winding, the surface of the article 1 is treated with an adhesive agent, so that a better connection with the glass fiber-reinforced outer casing is achieved.

The winding mandrel 5 on which the article 1 is mounted is placed between a headstock 21 and a tailstock 22 of the winding machine 20. Mandrel 5 is rotatable about an axis A.

A tape guiding unit 24 is arranged on a carriage 23 which is slidable in X-direction and Y-direction. Tape guiding unit 24 is rotatable about axis B. The drives for sliding in X-direction and Y-direction and for rotation about A-axis and B-axis are NC-controlled, so that the winding procedure is carried out automatically in accordance with a program which is optimized by a computer.

Figure 1B:
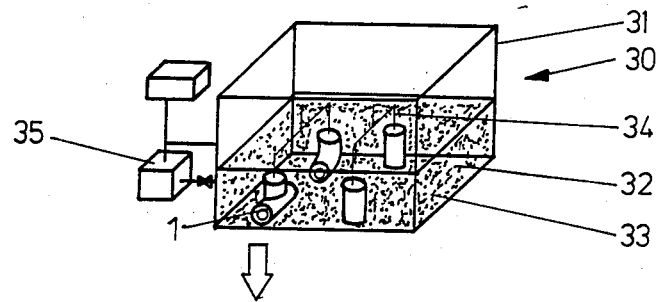

The winding of the tape in a single layer or several layers covering the entire surface of the article is ensured in an optimum manner even in the T-piece, because the glass fiber fabric tape 2 is rotated about axis B when the tape is wound onto the tubular end 1c. After winding, the tubular ends 1a, 1b, 1c are tightly closed, as illustrated in FIG. 3, and the round article 1 is impregnated with a resin in a vacuum impregnation bath 30, as seen in FIG. 1b.

The vacuum bath includes a container 31 which can be closed in an airtight manner. Arranged in container 31 are a basin 32 with a UV-hardening resin 33 and a lowerable support device 34 for the articles.

After the wound articles 1 have been placed in the container and the container has been closed, a vacuum pump 35 is used for producing a negative pressure in the container. The articles are immersed into the resin while the negative pressure is maintained and the resin bath is subsequently subjected to atmospheric pressure, so that the resin is forced into the glass fiber fabric. Subsequently, while the articles are still suspended in the resin, negative pressure and atmospheric pressure are again produced alternatingly in the container 31, so that thorough impregnation of the glass fiber fabric with resin is ensured.

Figure 1C:
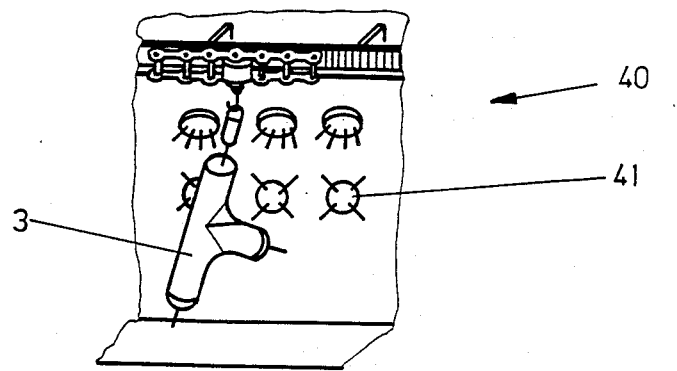

In order to avoid localized resin accumulations, the articles which are impregnated with resin are rotated as they are introduced into an irradiation chamber 40, illustrated in FIG. 1c. In chamber 40, the articles are subjected from all sides to UV-radiation by means of lamps 41. As a result, the resin is uniformly hardened.

Figure 1D:
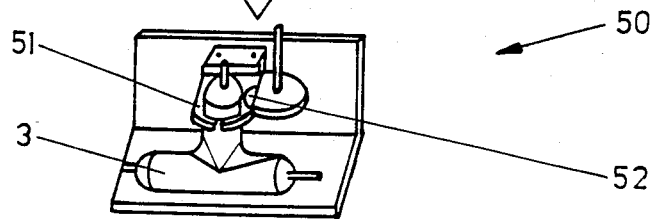

FIG. 1d shows a treatment station 50 which includes a chucking device 51 and a cutting tool 52, such as, a cutting-off disk or a circular saw. The cutting tool 52 is used to cut the ends of the hardened glass fiber windings which project beyond the thermoplastic article 1. The winding mandrel is then removed. The finished glass fiber reinforced article 3 is now ready for use in a pipeline system.

FIG. 2 of the drawing shows a T-shaped thermoplastic article 1 mounted on winding mandrel 5. Bushings 6 are inserted into tubular ends 1a, 1b, 1c of article 1 up to a stop surface 7. A sealing member 9 is provided in a centering seat 8. A T-shaped inner mandrel 11 is mounted in centric bores 10 of the three bushings 6. Inner mandrel 11 has ends 12 which project beyond the two bushings 6 at the tubular ends 1a, 1b. Mandrel parts 14 which can be clamped on by means of bushings 13 form together with the inner mandrel 11 the winding mandrel 5. After the glass fiber fabric tape 2 has been wound onto the article 1, the bushings 13 and the mandrel parts 14 are removed, so that cover caps 15 can be placed onto the slightly conical portions 16 of the bushings 6, as can be seen in FIG. 3. The ends 1a, 1b and 1c can be closed off in an airtight manner by means of a sealing member 17 placed on the seat for mounting cover 15. One of the cover caps 15, for example, the cover cap 15 mounted on bushing 6 and tubular end 1b, includes a hose 18 through which the interior of the article 1 is in communication through a bore 19 of bushing 6 to the ambient pressure. Thus, hose 18 makes it possible to subject also the interior of the article immersed in the resin bath with a negative pressure or a normal atmospheric pressure, while no resin can reach the interior of the article. The same bushing 6 and cover caps 15 can also be used in the case of angles and bends. Merely the inner mandrel and the mandrel parts mountable on the inner mandrel are constructed differently to form an appropriate winding mandrel having an axis of rotation.

While a specific embodiment of the invention has been shown and described in detail to illustrate the application of the inventive principles, it will be understood that the invention may be embodied otherwise without departing from such principles.

We claim:

1. In a method of manufacturing a fiber-reinforced shaped article of plastics material for pipeline systems, the article including an inner casing of injection-molded thermoplastic material, the inner casing having tubular ends, and an outer casing of a fiber winding impregnated with synthetic resin, the method including winding a dry glass fiber fabric tape in accordance with a given program onto the inner casing, the tape being wound onto the inner casing so that at least the entire surface thereof is covered, immersing the article formed of the inner casing and the tape wound thereon into a resin bath while a negative pressure is maintained, the resin bath containing an ultraviolet light-setting resin, subsequently subjecting the resin bath to atmospheric pressure, the improvement comprising inserting a bushing in each tubular end, prior to winding the tape onto the inner casing, mounting the bushings on a support mandrel, closing the tubular ends by means of cover caps after the tape has been wound on the inner casing, wherein at least one of the cover caps includes a venting hose, such that the interior of the article is connected to the ambient pressure acting on the resin bath, removing the impregnated article from the resin bath and hardening the resin by means of ultraviolet light while the article is simultaneously rotated.

2. The method according to claim 1, wherein after immersing the article in the resin bath, the resin bath is additionally subjected at least once alternatingly with a negative pressure and an atmospheric pressure.

3. The method according to claim 1, wherein an adhesive agent is applied to the inner casing before the glass fiber fabric tape is wound thereon.

4. The method according to claim 1, wherein the article is a T-shaped piece, further comprising additionally rotating the glass fiber fabric tape about its longitudinal axis during winding.

5. The method according to claim 1, comprising mechanically cutting any hardened glass fiber fabric tape which projects beyond the inner casing.

* * * * *